(12) United States Patent
Bhimavarapu et al.

(10) Patent No.: US 10,841,191 B2
(45) Date of Patent: Nov. 17, 2020

(54) PERSON SUPPORT APPARATUSES WITH COMMUNICATION CHANNEL MONITORING

(71) Applicant: Stryker Corporation, Kalamazoo, MI (US)

(72) Inventors: Krishna Sandeep Bhimavarapu, Kalamazoo, MI (US); Jerald A. Trepanier, Kalamazoo, MI (US); Jonathan Mark Greenbank, Plainwell, MI (US); Anuj K. Sidhu, Kalamazoo, MI (US); Michael Joseph Hayes, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 16/299,822

(22) Filed: Mar. 12, 2019

(65) Prior Publication Data

US 2019/0207836 A1 Jul. 4, 2019

Related U.S. Application Data

(63) Continuation of application No. 15/279,918, filed on Sep. 29, 2016, now Pat. No. 10,257,063.

(60) Provisional application No. 62/236,452, filed on Oct. 2, 2015.

(51) Int. Cl.
*H04L 12/26* (2006.01)
*H04B 17/345* (2015.01)
*H04B 17/318* (2015.01)

(52) U.S. Cl.
CPC ....... *H04L 43/0864* (2013.01); *H04B 17/318* (2015.01); *H04B 17/345* (2015.01); *H04L 43/045* (2013.01)

(58) Field of Classification Search
None
See application file for complete search history.

(56) References Cited

U.S. PATENT DOCUMENTS

| | | | |
|---|---|---|---|
| 7,054,296 B1 * | 5/2006 | Sorrells | H04B 1/406 370/338 |
| 9,463,325 B1 * | 10/2016 | Young | A61N 1/37217 |
| 2002/0181547 A1 * | 12/2002 | Feher | H04L 27/2032 375/130 |
| 2006/0215596 A1 * | 9/2006 | Krishnaswamy | H04L 1/0002 370/328 |

(Continued)

*Primary Examiner* — Bunjob Jaroenchonwanit
(74) *Attorney, Agent, or Firm* — Warner Norcross + Judd LLP

(57) ABSTRACT

A monitoring system includes one or more units that are adapted monitor the radio frequency conditions of a facility or portion of the facility. The units include a packet sniffer and/or an RF spectrum analyzer. Sniffed packets and spectrum data are recorded and made available for analysis and display, either locally on the units or at one or more remote locations. The locations of the units are also gathered, thereby enabling correlation of the sniffed packets and/or RF spectrum data with locations within the facility. Real time RF conditions can thereby be gathered and used to improve the wireless communications within the facility and/or to ensure the wireless communication infrastructure of the facility is operating satisfactorily. The units may be person support apparatuses, such as beds, chairs, stretchers, cots, or the like.

12 Claims, 8 Drawing Sheets

(56) References Cited

U.S. PATENT DOCUMENTS

| | | | | |
|---|---|---|---|---|
| 2007/0219473 | A1* | 9/2007 | Talish | A61B 5/1036 601/46 |
| 2008/0285462 | A1* | 11/2008 | Baker | H04W 16/18 370/241 |
| 2009/0112630 | A1* | 4/2009 | Collins, Jr. | G06F 19/3418 705/3 |
| 2010/0124886 | A1* | 5/2010 | Fordham | H04B 17/382 455/67.11 |
| 2012/0044973 | A1* | 2/2012 | Johnson | H04W 36/30 375/136 |
| 2012/0153148 | A1* | 6/2012 | Federici | G01N 21/3581 250/332 |
| 2015/0312422 | A1* | 10/2015 | Leemet | H04L 41/082 455/406 |
| 2016/0373941 | A1* | 12/2016 | Daijavad | H04W 24/02 |

* cited by examiner

| No. | Time | Source | Destination | Protocol | Length | Info |
|---|---|---|---|---|---|---|
| 1 | 0.000000 | 145.254.160.237 | 65.208.228.223 | TCP | 62 | 3372-80 [SYN] Seq-0 Win-8760 Len-0 MSS1460 SACK_PERM-1 |
| 2 | 0.911310 | 65.208.228.223 | 145.254.160.237 | TCP | 62 | 80-3372 [SYN, ACK] Seq-0 Ack-0 WIN5840 Len-0 MSS-1380 SACK |
| 3 | 0.911310 | 145.254.160.237 | 65.208.228.223 | TCP | 54 | 3372-80 [Ack] Seq-1 Ack-1 Win-9660 Len-0 |
| 4 | 0.911310 | 145.254.160.237 | 65.208.228.223 | HTTP | 533 | GET /download,html HTTP/1.1 |
| 5 | 1.472116 | 65.208.228.223 | 145.254.160.237 | TCP | 54 | 80-3372 [Ack] Seq-180 Ack-480 win-6432 Len-0 |
| 6 | 1.682419 | 65.208.228.223 | 145.254.160.237 | TCP | 1434 | [TCP segment of a reassembled PDU] |
| 7 | 1.812606 | 145.254.160.237 | 65.208.228.223 | TCP | 54 | 3372-80 [Ack] Seq-180 Ack-1381 Win-9660 Len-0 |
| 8 | 1.812606 | 65.208.228.223 | 145.254.160.237 | TCP | 1434 | [TCP segment of a reassembled PDU] |
| 9 | 2.443513 | 65.208.228.223 | 145.254.160.237 | TCP | 54 | 3372-80 [Ack] Seq-180 Ack-1381 Win-9660 Len-0 |

⊞ Frame 2: 62 bytes on wire (496 bits), 62 bytes captured (496 bits)
⊞ Ethernet II, Src: fe:ff:20:00:01:00 (fe:ff:20:00:01:00), Dst: xerox_00:00:00 (00:00:01:00:00:00)
⊞ Internet Protocol Version 4, Src: 65.208.228.223 (65.208.228.223), Dst: 145.254.160.237 (145.254.160.237)

FIG. 5

PERSON SUPPORT APPARATUSES WITH COMMUNICATION CHANNEL MONITORING

CROSS-REFERENCE TO RELATED APPLICATIONS

This application claims priority to commonly assigned U.S. patent application Ser. No. 15/279,918 filed Sep. 29, 2016, by inventors Jerald Trepanier et al. and entitled PERSON SUPPORT APPARATUSES WITH COMMUNICATION CHANNEL MONITORING, which in turn claims priority to commonly assigned U.S. provisional patent application Ser. No. 62/236,452 filed Oct. 2, 2015, by inventors Jerald Trepanier et al. and entitled PERSON SUPPORT APPARATUSES WITH COMMUNICATION CHANNEL MONITORING, the complete disclosures of both of which are incorporated herein by reference.

BACKGROUND

The present disclosure relates to medical devices, such as person support apparatuses, that are used in medical facilities, such as hospitals and the like.

Medical facilities often use a plurality of devices that communicate wirelessly. Such communication often includes WiFi communication, Bluetooth communication, and/or other wireless protocols. In order for the devices to be able to successfully communicate with each other, it is desirable that the wireless communication signals are not subjected to undue interference from electromagnetic waves emanating from other communicating devices, from background noise, or from other sources.

SUMMARY

A person support apparatus, according to at least one embodiment, includes an RF spectrum analyzer and/or a packet sniffer that provides RF spectrum analysis of the radio frequency signals detectable by the person support apparatus and/or packet traffic data regarding wirelessly communicated packets that are detectable by the person support apparatus. In some embodiments, a plurality of such person support apparatuses are positioned throughout all or a portion of a medical facility and the spectrum analysis and/or packet data gathered from the person support apparatuses are communicated to one or more user interfaces. The communicated data also includes data indicating the location of the person support apparatuses. The user interface thereby effectively provides users with an RF site survey and/or report of network traffic throughout the facility, or portion of the facility.

Such RF site survey data and/or network traffic data can be generated repeatedly and/or continuously, thereby providing appropriate personnel of the medical facility with sufficient information to determine whether to make changes to the communication infrastructure of the facility. The data gathered from the person support apparatuses therefore enables such personnel to ensure that the appropriate coverage and bandwidth are available at all desired areas of the facility. Still further, in some embodiments, the person support apparatuses may use the RF spectrum analysis data and/or packet data to adjust their own communications in order to reduce interference and/or to reduce loads on communication pathways.

According to a first embodiment, a system is provided that includes a plurality of person support apparatuses and each of the person support apparatuses is associated with a radio frequency (RF) spectrum analyzer adapted to gather RF spectrum data. The system further includes at least one user interface. The user interface is in communication with the plurality of person support apparatuses and is adapted to receive the RF spectrum data from the RF spectrum analyzers. The user interface thereby provides RF spectrum to one or more suitable personnel.

According to a second embodiment, a system is provided that includes a plurality of person support apparatuses wherein each of the person support apparatuses includes a packet sniffer. The packet sniffer detects packets transmitted over a first communication channel between an access point and a first device other than the person support apparatus. The system further includes a user interface in communication with the plurality of person support apparatuses. The user interface receives data regarding the detected packets from the packet sniffers.

In some embodiments, the user interface communicates with a server that receives the RF spectrum data from the RF spectrum analyzers and/or the data regarding the detected packets from the packet sniffers. The server is located on a healthcare facility computer network that includes a plurality of wireless access points which the plurality of person support apparatuses utilize to communicate with the user interface.

In some embodiments, the user interface is coupled to one of the plurality of person support apparatuses.

Each of the RF spectrum analyzers and/or packet sniffers are located onboard a corresponding one of the plurality of person support apparatuses, in at least some embodiments of the system. In other embodiments, each of the RF spectrum analyzers and/or packet sniffers are incorporated into a unit spaced apart from a corresponding one of the plurality of person support apparatuses. Each unit wirelessly communicates with a corresponding person support apparatuses. In some embodiments, such communication uses both an infrared frequency protocol and a radio frequency protocol. Each unit may be assigned a unique ID where the location of each unit is mapped in a database to the assigned unique IDs. The unique IDs are transmitted, in at least some embodiments, to the user interface.

A controller is located onboard each of the person support apparatuses, in at least some embodiments. The controller controls when the corresponding RF spectrum analyzer gathers the RF spectrum data and/or when the corresponding packet sniffer gathers the packet data. The user interface includes a control adapted to send a message to at least one of the controllers. The message causes the controller to command at least one of the RF spectrum analyzers to gather and/or transmit RF spectrum data to the user interface, and/or to command at least one of the packet sniffers to gather and/or transmit packet data.

In some embodiments, the controllers command the RF spectrum analyzers and/or packet sniffers to gather data at different time periods, and the controllers transmit the gathered data at different time periods to the user interface. When the user interface receives the gathered data, it sorts the data according to the time periods that the data was gathered.

Each of the person support apparatuses are one of a bed, a stretcher, a cot, an operating table, or a chair, in at least some embodiments.

The controller on board a person support apparatuses is adapted, in some embodiments, to use the RF spectrum data from its corresponding RF spectrum analyzer to adjust how the person support apparatus wirelessly communicates.

The RF spectrum data includes data regarding one or more of the following: data gathered from a spectrum range that encompasses 2.41 gigahertz to 2.46 gigahertz; data indicating a signal strength for at least three RF channels; data indicating a latency for communications between a wireless transceiver onboard the corresponding person support apparatus and a wireless access point; data indicating a data rate for at least one RF channel; data indicating a signal-to-noise ratio of wireless signals received at the corresponding person support apparatus, and data indicating a Service Set Identifier (SSID) of one or more wireless networks.

When one or more of the person support apparatuses includes a packet sniffer, the packet sniffer may be adapted to identify devices that are within wireless range of the person support apparatus and to forward a list of the identified devices to the user interface. The packet sniffer, in some embodiments, also detects traffic volumes for each of the devices and forwards the traffic volumes to the user interface. The packet sniffer may also, or alternatively, categorize the detected packets according to packet type. In some embodiments, the packet sniffer is adapted to detect packets transmitted over a second communication channel between the access point and a second device.

According to another embodiment, a person support apparatus is provided that includes a support surface, a wireless transceiver, and an RF spectrum analyzer. The support surface is adapted to support a person. The wireless transceiver is adapted to wirelessly communicate with an access point of a local area network over a first communication channel that is selected by the access point. The RF spectrum analyzer communicates with the wireless transceiver and analyzes a signal strength of both the first communication channel and a second communication channel.

According to another embodiment, a person support apparatus is provided that includes a support surface adapted to support a person, a wireless transceiver, and a packet sniffer. The wireless transceiver wirelessly communicates with an access point of a local area network over a first communication channel that is selected by the access point. The packet sniffer communicates with the wireless transceiver and is adapted to detect packets transmitted over the first communication channel between the access point and a first device other than the person support apparatus.

In some embodiments, the RF spectrum analyzer is further adapted to analyze a signal strength of a third communication channel. When so adapted, the RF spectrum analyzer forwards data from the signal strength analysis of the first, second, and third communication channels to the access point via the first communication channel. The first, second, and third communication channels have center frequencies of 2412 megahertz, 2437 megahertz, and 2462 megahertz, respectively, in at least one embodiment.

In some embodiments, the packet sniffer is adapted to identify a source identifier and a destination identifier of each packet. The source identifier is at least one of an Internet Protocol (IP) source address and Media Access Control (MAC) source address, and the destination identifier is at least one of an IP destination address and a MAC destination address.

The packet sniffer detects packets transmitted over the second and third communication channels between the access point and a second and a third device, respectively, in some embodiments.

The wireless transceiver communicates using both a direct sequence spread spectrum (DHSS) technique and a frequency hopping spread spectrum (FHSS) technique.

The person support apparatus includes a controller that, in some embodiments, gathers data regarding the first communication channel at multiple time periods, determines a pattern from the data, and determines what channels to use when communicating via the FHSS technique based upon the pattern. The wireless transceiver communicates using the FHSS technique with a device separate from the access point.

In some embodiments, the person support apparatus further includes an infrared transceiver and a controller, and the controller is adapted to communicate messages using the infrared transceiver instead of the wireless transceiver if the controller determines that substantial interference is likely when communicating using the wireless transceiver.

According to still another embodiment, a person support apparatus is provided that includes a support surface adapted to support a person, a wireless transceiver, and an RF spectrum analyzer. The wireless transceiver wirelessly communicates with a device using a frequency hopping spread spectrum (FHSS) technique that utilizes a set of channels within a frequency range. The RF spectrum analyzer gathers signal strength data regarding the set of channels at multiple time periods. The RF spectrum analyzer also determines a pattern from the signal strength data gathered at multiple time periods, and uses the pattern to determine whether or not to use a subset of the set of channels when using the wireless transceiver to communicate with the device.

The RF spectrum analyzer is further adapted, in some embodiments, to time stamp the signal strength data gathered at multiple time periods and store the time stamped signal strength data in a memory.

Determining the pattern from the signal strength data gathered at multiple time periods includes, in some embodiments, determining a trend in the signal strength data for one or more channels within the set of channels. Determining the pattern from the signal strength data may also, or alternatively, include determining a time of a day at which a channel within the set of channels has a signal strength above or below a threshold.

Determining the pattern from the signal strength data may also involve using signal strength readings gathered over at least a one hour time period.

In some embodiments, the wireless transceiver is further adapted to wirelessly communicate with an access point of a local area network using a direct sequence spread spectrum (DSSS) technique, and the RF spectrum analyzer is adapted to transmit at least a portion of the signal strength data to the access point using the wireless transceiver.

The person support apparatus may also include, in some embodiments, an infrared (IR) transmitter and a controller adapted to automatically switch from using the wireless transceiver to using the IR transmitter to communicate with the device if the FHSS technique becomes inviable. The controller is further adapted to transmit a message to the access point using the wireless transceiver when the controller switches from using the wireless transceiver to using the IR transmitter for communicating with the device.

In still another embodiment, a person support apparatus is provided that includes a support surface adapted to support a person, a wireless transceiver, and a packet sniffer. The wireless transceiver wirelessly communicates with a first access point of a local area network over a first communication channel selected by the first access point. The packet sniffer communicates with the wireless transceiver and is adapted to detect packets transmitted over a second communication channel between a second access point and a device other than the person support apparatus.

The packet sniffer is, in some embodiments, further adapted to detect packets transmitted over the second communication channel while the person support apparatus is communicating with the first access point over the first communication channel.

The packet sniffer may record in memory the contents of the packets (either the complete contents or a portion of the contents), including those packets that were not sent either to or from the person support apparatus. The contents of the packets are stored in the memory until directed by an authorized user to discard, in at least some embodiments. Further, in some embodiments, a display is included upon which the contents of the packets are displayable.

Before the various embodiments disclose herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

BRIEF DESCRIPTION OF THE DRAWINGS

FIG. 5 is an illustration of captured packet traffic that may be displayed on one or more of the user interfaces of the system of FIG. 1;

DETAILED DESCRIPTION OF THE EMBODIMENTS

Figure 1:
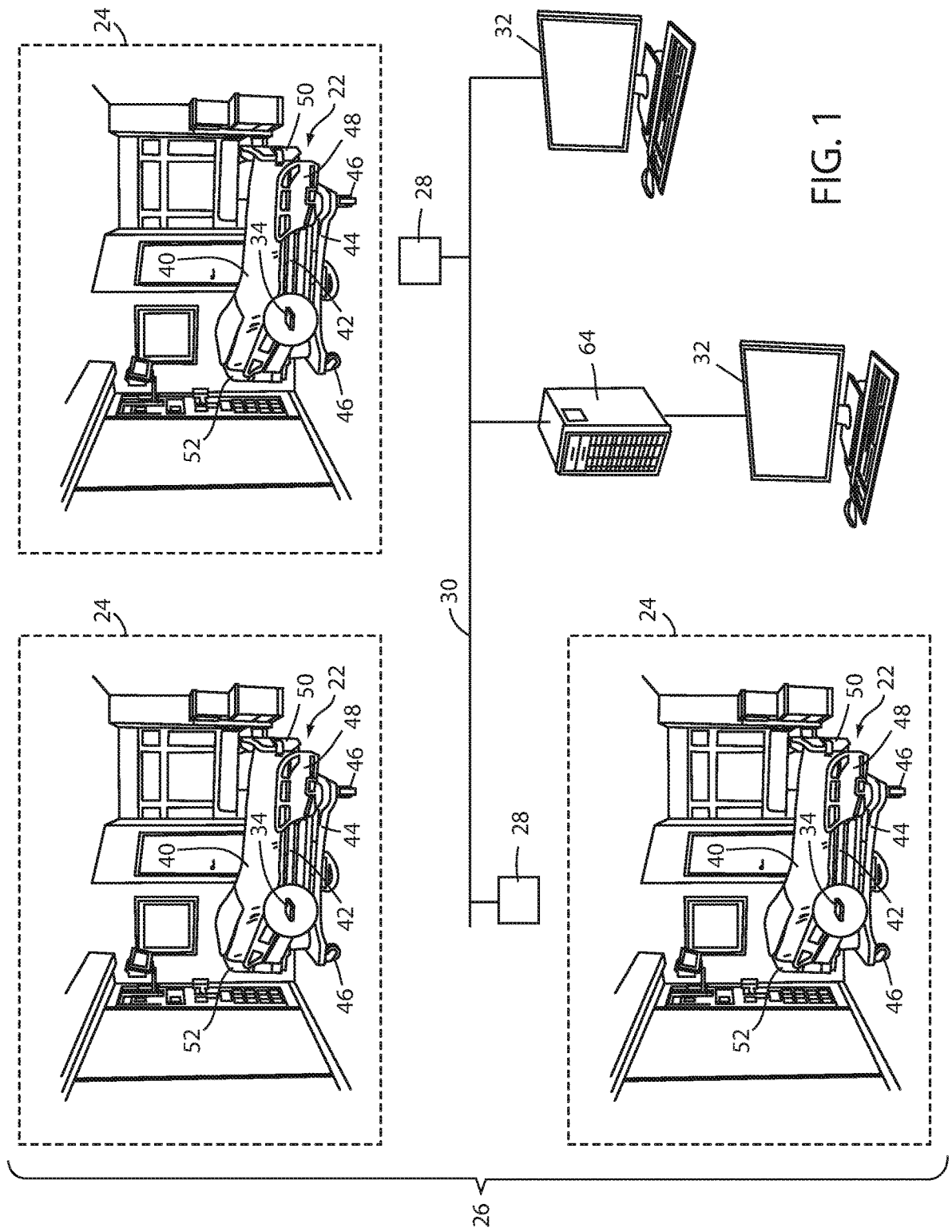
FIG. 1 is a perspective view of a monitoring system according to a first embodiment of the disclosure.

An illustrative layout of a monitoring system 20 is shown in FIG. 1 according to one embodiment. Monitoring system 20 includes a plurality of person support apparatuses 22 that are positioned in one or more rooms 24 of a facility 26. System 20 further includes one or more wireless access point 28 that are coupled to a local area network 30. One or more user interfaces 32 are also included within system 20. Such user interfaces may be coupled to network 30 or they may be integrated into person support apparatuses 22. In the example shown in FIG. 1, the user interfaces 32 that are coupled to network 30 are shown as being implemented as computer terminals. It will be understood, however, that user interfaces 32 may take on other forms, including laptop computers, stand-alone displays, tablet computers, smart cell phones, and/or other devices.

Monitoring system 20 is adapted to monitor one or more aspects of the radio frequency (RF) environment of facility 26. In some embodiments, monitoring system 20 is adapted to carry out the equivalent of an RF site survey of facility 26 continuously, repetitively, or in response to one or more commands from one or more user interfaces 32. Such a site survey is carried out automatically without requiring any users to manually carry RF spectrum analyzers throughout the facility. Monitoring system 20 is specifically adapted to gather one or more of the following types of information about the RF environment of facility 26: the extent of wireless coverage of the wireless access points 28 within facility 26, measurements of rates at which data is communicated to and/or from wireless access points 28; the ability of wirelessly communicating devices to roam throughout facility 26 without losing communication with one or more access points 28; signal strengths of access points 28 and devices in communication therewith at different locations of facility 26; sources and strengths of RF interference; and/or quality of service of the wireless portions of local area network 30. In addition to, or in lieu of gathering such RF data, monitoring system 20 is adapted, in at least one embodiment, to detect wireless packets traveling over the wireless portions of local area network 30 (and/or other networks that are within range of one or more person support apparatuses 22) and to report statistics and traffic data regarding the detected packets, as will be discussed in greater detail below.

Figure 2:
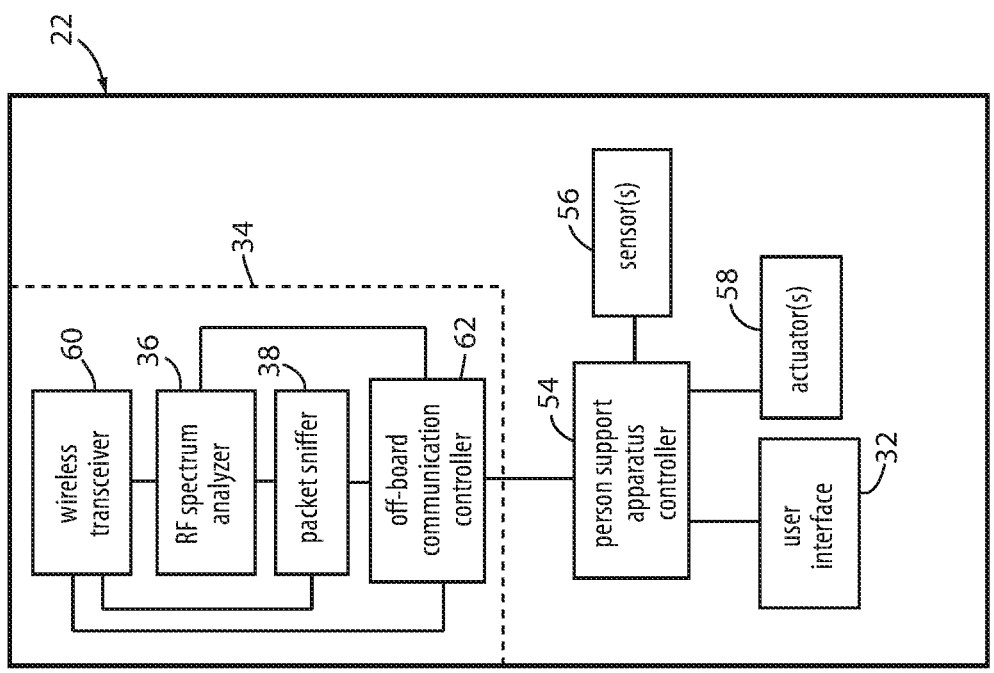
FIG. 2 is a diagram of one of the person support apparatuses of the monitoring system of FIG. 1.

Each of the person support apparatuses 22 shown in FIG. 1 includes a wireless communication module 34. As will be discussed in greater detail below, each wireless communication module 34 includes a wireless transceiver that is adapted to wirelessly communicate with one or more of the wireless access points 28. In at least one embodiment, wireless communication module 34 uses a WiFi protocol (e.g. IEEE 802.11a, b, g, n, ac, ad, ah, aj, ax, and/or ay) to communicate with access points 28. Other types of protocols, however, can be used. Each communication module 34 also includes an RF spectrum analyzer 36 (FIG. 2) and/or a packet sniffer 38 (FIG. 2). RF spectrum analyzers 36 and packet sniffers 38 detect and gather local RF spectrum data and traffic data. That is, RF spectrum analyzers 36 and packet sniffers 38 collect RF spectrum data and wireless packet traffic in those local regions of facility 26 where the person support apparatuses 22 are located. The collected data from each person support apparatus 22, along with the location of the corresponding person support apparatuses 22, is combined with similarly collected data from other person support apparatuses 22 that are positioned in other areas of the facility 26. The combined data is made available for viewing and/or analysis at one or more user interfaces 32, thereby allowing a user of such a user interface 32 to view both current and historical RF spectrum data and traffic data at virtually all areas of the facility. Such data can be used to troubleshoot and/or prevent communication problems, as well as for other purposes.

In the embodiment of monitoring system 20 shown in FIG. 1, each person support apparatus 22 is shown to be a bed having a support surface 40 that is adapted to support a patient thereon. Support surface 40, as shown, is a mattress that is supported on a deck 42 of the bed. Deck 42, in turn, is supported in a height adjustable manner on a base 44 having a plurality of wheels 46. One or more siderails 48 may also be included that are pivotable between lowered and raised orientations. A footboard 50 and headboard 52 are also coupled to a foot end and head end, respectively, of the bed. In some embodiments (not shown), a user interface 32 is integrated into one or more components of the person support apparatus 22 itself, such as, but not limited to, being incorporated into the footboard 50 and/or one or more of the siderails 48. When implemented as a bed, further details of several manners of constructing person support apparatus 22 may be found in commonly assigned, U.S. Pat. No. 7,690,059 issued to Lemire et al., and entitled HOSPITAL BED; in commonly assigned U.S. Pat. publication no. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION; and/or in the Stryker Maintenance Manual for the MedSurg Bed, Model 3002 S3, published in 2010 by Stryker Corporation of Kalamazoo, Mich., the complete disclosures of all of which are hereby incorporated herein by reference. Other constructions of person support apparatus 22 when implemented as a bed are, of course, possible.

Person support apparatuses 22 may also or alternatively be implemented as stretchers, cots, recliners, non-reclining chairs, operating tables, or in other manners. When implemented as a stretcher or cot, person support apparatuses 22 may be constructed in any of the manners disclosed in commonly assigned U.S. Pat. No. 8,051,511 issued to Nahavandi et al. on Nov. 8, 2011 and entitled EMERGENCY STRETCHER; or commonly assigned U.S. Pat. No. 5,537,700 issued to Way et al. on Jul. 23, 1996 and entitled EMERGENCY STRETCHER WITH X-FRAME SUPPORT, the complete disclosures of both of which are hereby incorporated by reference herein. When person support apparatus 22 is implemented as a recliner, it may be constructed in any of the manners disclosed in commonly assigned U.S. patent application Ser. No. 14/212,253 filed Mar. 14, 2014 by inventors Christopher Hough et al. and entitled MEDICAL SUPPORT APPARATUS, the complete disclosure of which is also incorporated herein by reference. Still other constructions of person support apparatuses 22 may be used when one or more of the person support apparatuses 22 are implemented as cots, stretchers, and/or recliners.

Regardless of the mechanical construction of person support apparatuses 22, each person support apparatus typically includes a person support apparatus controller 54, one or more sensors 56, one or more actuators 58, a user interface 32, and, as noted, a wireless communication module 34 (FIG. 2). Wireless communication module 34 includes one or more wireless transceivers 60, an off-board communication controller 62, RF spectrum analyzer 36, and packet sniffer 38. Off-board communication controller 62 communicates with person support apparatus controller 54, as well as wireless transceiver 60, RF spectrum analyzer 36, and packet sniffer 38. Person support apparatus controller 54, in turn, communicates with sensors 56, actuators 58, and user interface 32. The communication between person support apparatus controller 54 and off-board communication controller 62 takes place via an Ethernet connection between these two controllers, in at least one embodiment. Examples of such internal Ethernet communication between controllers are disclosed in commonly assigned U.S. patent application Ser. No. 14/622,221 filed Feb. 13, 2015, by inventors Krishna Bhimavarapu et al. and entitled COMMUNICATION METHODS FOR PATIENT HANDLING DEVICES, the complete disclosure of which is hereby incorporated herein by reference.

Each of person support apparatus controller 54 and off-board communication controller 62 are implemented, in at least one embodiment, as one or more microcontrollers. For example, in at least one embodiment, both person support apparatus controller 54 and off-board communication controller 62 are implemented as any one of the i.MX family of system-on-chip (SoC) processors which are marketed by Freescale Semiconductor of Austin, Tex. Other types of commercially available microcontrollers may also be used. Still further, controllers 54 and 62 may take on still other forms, such as any combination of any one or more microprocessors, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by controllers 54 and 62 in carrying out the functions described herein, as well as the data necessary for carrying out these functions, are stored in one or more accessible memories (not shown).

User interface 32 of person support apparatus 22, in at least one embodiment, includes a touchscreen display for displaying information used in the control and operation of person support apparatus 22, as well as information gathered from RF spectrum analyzer 36 and/or packet sniffer 38. In other embodiments, user interface 32 includes a non-touch screen display. Person support apparatus controller 54 communicates information to user interface 32 that is to be displayed to a user of person support apparatus 22. In addition to displaying information to a user, user interface 32 also includes one or more controls for receiving commands from a user of person support apparatus 22. Such controls are implemented as one or more buttons, switches, knobs, dials, touch icons, or in other manners. User interface 32 forwards command signals and/or messages to person support apparatus controller 54 in response to the commands input via the controls. Person support apparatus controller 54 responds to such commands by activating one or more actuators, or taking other suitable action in response to the commands.

In some embodiments, actuators 58 include multiple motors for moving components of person support apparatus 22, such as actuators for changing a height and/or angle of deck 42, pivoting one or more components of deck 42, activating or deactivating a brake on person support apparatus 22, and/or other actions. Sensors 56 include, in at least some embodiments, one or more sensors for detecting the position of the movable components of person support apparatus 22. The outputs from such sensors are used to enable closed-loop control of the movement of these components. Sensors 56 may also include a scale system adapted to measure a weight of an occupant of person support apparatus, and/or an exit detection system adapted to detect when a person on support surface 40 exits, or is about to exit, from person support apparatus 22. In one embodiment, sensors 56 include an exit detection system that operates in one or more of the manners described in either of the following commonly assigned patent applications: U.S. patent application Ser. No. 62/065,242 filed Oct. 17, 2014 by inventors Marko Kostic et el. and entitled PERSON SUPPORT APPARATUSES WITH MOTION MONITORING; and PCT patent application serial number PCT/US2014/026030 filed Mar. 13, 2014 by applicant Stryker Corporation and entitled PATIENT SUPPORT APPARATUS WITH PATIENT INFORMATION SENSORS. Still other types of sensors 56 may be included on person support apparatus 22.

Person support apparatus controller 54 forwards selected information about person support apparatus 22 to a remote support apparatus server 64 that is communicatively coupled to local area network 30 (FIG. 1). Support apparatus server 64, in turn, makes all or a portion of that information available to any authorized software application that is in communication with local area network 30. Such information may include a variety of different information about person support apparatus 22, such as the status of the exit detection system (armed, disarmed, and/or alerting), the weight of an occupant of person support apparatus 22, the position of siderails 48, the state of a brake, the height of deck 42, the location of person support apparatus 22, and/or other information. Person support apparatus controller 54 forwards the information to support apparatus server 64 by first forwarding the information to off-board communication controller 62. Off-board communication controller 62 oversees all off-board communications of person support apparatus 22. In response to receiving the information to be forwarded to support apparatus server 64, off-board communication controller 62 forwards the information to wireless transceiver 60 which, in turn, wirelessly communicates the information to an access point 28. The access point 28 then forwards the information to support apparatus server 64 via one or more wired or wireless connections of local area network 30.

In addition to sending information to support apparatus server 64 that is received from person support apparatus controller 54, communication modules 34 also send information to support apparatus server 64 that is generated from RF spectrum analyzer 36 and/or from packet sniffer 38. RF spectrum analyzer 36 is adapted to take RF signal strength readings over one or more frequency ranges. In at least one embodiment, the frequency ranges include all of the frequencies that person support apparatuses 22 utilize for communicating with access points 28 and/or other devices, as well as all of the frequencies other wireless communication devices within facility 26 utilize for communication. Thus, for example, when person support apparatuses 22 utilize WiFi communications for communicating with access points 28, RF spectrum analyzers 36 are adapted to take signal strength readings over one or more of the following frequency ranges: 2.4 to 2.5 gigahertz (GHz); 3.6 to 3.7 GHz; 5 to 5.9 GHz; and/or 58 to 64 GHz. These frequency ranges are given here merely as examples of the frequency ranges, and RF spectrum analyzer 36 may take RF readings over larger ranges than these. Further, different countries regulate the RF spectrum in different manners and the frequencies used by person support apparatus 22 in communicating with access points 28 may vary from country to country. The frequencies analyzed by RF spectrum analyzer 36 will therefore also vary from country to country in such situations.

In addition to monitoring signals in the frequency range(s) used by person support apparatuses 22 to wirelessly communicate, RF spectrum analyzers 36 may also be configured to take signal strength readings of other frequencies that are used by other devices for communication, or that are otherwise of interest to the managers of facility 26. For example, facility 26 may include one or more portable communication devices, such as cordless phones, that utilize 900 MHz frequencies for communication. In such instances, RF spectrum analyzer 36 can be instructed, utilizing one or more of the user interfaces 32, to take signal strength readings generally near the 900 MHz range. RF spectrum analyzer 36 may also take signal strength readings over still other frequency ranges, including, but not limited to, cellular communication frequencies.

In at least one embodiment, RF spectrum analyzer 36 outputs RF spectrum data in a graphical format that plots the frequencies on the x-axis of a graph and the measured signal strengths for each of the frequencies on a y-axis of the graph. Such plots of signal strength are also time stamped and stored in memory so that historical RF spectrum data can be view and analyzed. User interface 32 includes controls that enable a user to select a time and to view the corresponding plot of frequency signal strengths for the selected time.

In some embodiments, RF spectrum analyzer 36 also processes the signal strength readings so as to enable them to be displayed in a graphical format wherein the x-axis of the graph corresponds to time, the y-axis corresponds to the detected signals strength readings, and separately colored lines are displayed for the signal strength readings of the different access points 28 and communicating devices. Each of the colored lines represents the signal strength that is detected by RF spectrum analyzer 36 for a given access point 28 or device detected at different times. A different color is assigned to each access point 28 and device and a legend or key is provided that indicates which color corresponds to which access point 28 or device.

In some embodiments, the data is processed so that it can be displayed graphically as a "heat map." Such "heat map" displays utilize different colors to indicate how the signal strength readings change over time. For example, if the signal strength detected at, say, 1432 MHz, over a ten minute period was in the range of −50 dBm (decibel-milliwatts) to −40 dBm for more than fifty percent of the ten minute period, the −40 to −50 dBm range is colored a first color. Other colors are used for other signal strengths that aren't as common during the time period. The colors therefore provide an indication of how predominant the measured signals strengths are over time.

In still other embodiments, RF spectrum analyzer 36 leaves the processing and display of the spectrum data it gathers to the user interface 32 and/or another software application that is in communication with one or more of the user interfaces 32. User interface 32 and/or the software in communication with user interface 32 therefore controls how the gathered data is organized, graphed, and/or colored.

RF spectrum analyzers 36 are programmed, by default, to periodically and automatically gather and store RF spectrum data. This default programming can be overwritten via either the user interface 32 positioned on board each person support apparatus 22, or by the user interfaces 32 that are coupled to local area network 30 and located remotely from the person support apparatuses 22. That is, a user can utilize user interface 32 to command when RF spectrum analyzers 36 gather RF spectrum data. In some embodiments, user interfaces 32 of each person support apparatus 22 can be used to control the RF spectrum analyzers 36 of other person support apparatuses 22, while in other embodiments, user interfaces 32 of each person support apparatus are only capable of controlling the RF spectrum analyzer 36 positioned on-board the same person support apparatus 22. In either embodiment, those user interfaces 32 that are positioned off-board the person support apparatuses 22 are able to command one or all of the RF spectrum analyzers 36. Indeed, in at least one embodiment, the user interfaces 32 that are positioned off-board the person support apparatuses 22 are able to issue a command globally to all, or a subset of all, of the RF spectrum analyzers to being RF spectrum monitoring, thereby enabling a user of such user interfaces to avoid having to send individual commands to each of the RF spectrum analyzers 36.

In addition to commanding when and how frequently the RF spectrum analyzers 36 are to gather RF spectrum data, the user interfaces 32 are also configured to allow a user to specify additional details about the RF spectrum data that is to be gathered. For example, user interfaces 32 are configured to allow a user to specify what specific frequency ranges RF spectrum data is to be gathered over. User interfaces 32 are also configured to allow a user to specify what items within the gathered RF spectrum data are to be transmitted to support apparatus server 64 and when such items are to be transmitted to support apparatus server 64.

Still further, in at least one embodiment, user interfaces 32 are configured to enable a user to specify conditions that trigger an alert message from the person support apparatus 22. The alert message is transmitted to support apparatus server 64 and forwarded onto a communication server (e.g. a conventional nurse call system server, an email server, or some other application that forwards the alert to appropriate personnel, such as caregivers and/or technicians). The alert message is generated in response to one or more user-specified conditions detected by RF spectrums analyzer 36. Such conditions include signal strengths from access points 28 decreasing below a signal strength threshold, channel utilization exceeding a channel utilization threshold, signal-to-noise ratios exceeding an SNR threshold, interference exceeding an interference threshold, and still other conditions exceeding other types of thresholds. By including the ability for a user to define and specify the conditions for such alerts, suitable personnel can be promptly notified of any wireless connectivity issues within facility 26.

In addition to gathering RF spectrum data from RF spectrum analyzers 36, monitoring system 20 is also adapted to gather location information from each of the RF spectrum analyzers 36. The manner in which this location information is gathered can be varied. In one embodiment, a conventional off-the-shelf real time locating system (RTLS) system is used. Such an RTLS system involves, in some embodiments, tagging each person support apparatus 22 with a conventional RF ID tag, or other type of electronic tag, that emits an RF signal in response to an interrogation signal. The interrogation signals are emitted by multiple units (not shown) positioned throughout the facility at known locations. Because of the known position of the multiple units and the relative signals strengths of the responses to the interrogations, the positions of each of the person support apparatuses 22 can be determined within the facility. The locations of these person support apparatuses are then communicated, in at least one embodiment, to support apparatus sever 64, which correlates the position data with the RF spectrum data. That is, support apparatus server 64 matches the RF spectrum data of each person support apparatus 22 with the location information received from the RTLS system.

In another embodiment, the location of each person support apparatus 22 is determined in any of the manners disclosed in commonly assigned U.S. Pat. No. 8,674,826 issued to Becker et al. on Mar. 18, 2014, and entitled LOCATION DETECTION SYSTEM FOR A DEVICE, the complete disclosure of which is hereby incorporated herein by reference. In other embodiments, the location of person support apparatuses 22 are determined in one or more of the manners disclosed in commonly assigned U.S. patent application Ser. No. 62/182,911 filed Jun. 22, 2015 by inventors Michael Hayes et al. and entitled PATIENT SUPPORT APPARATUSES WITH NAVIGATION AND GUIDANCE SYSTEMS, the complete disclosure of which is hereby incorporated herein by reference. In yet other embodiments, still different methods and/or structures are used to determine the locations of the person support apparatuses 22 and their respective RF spectrum analyzers 36.

Figure 3:
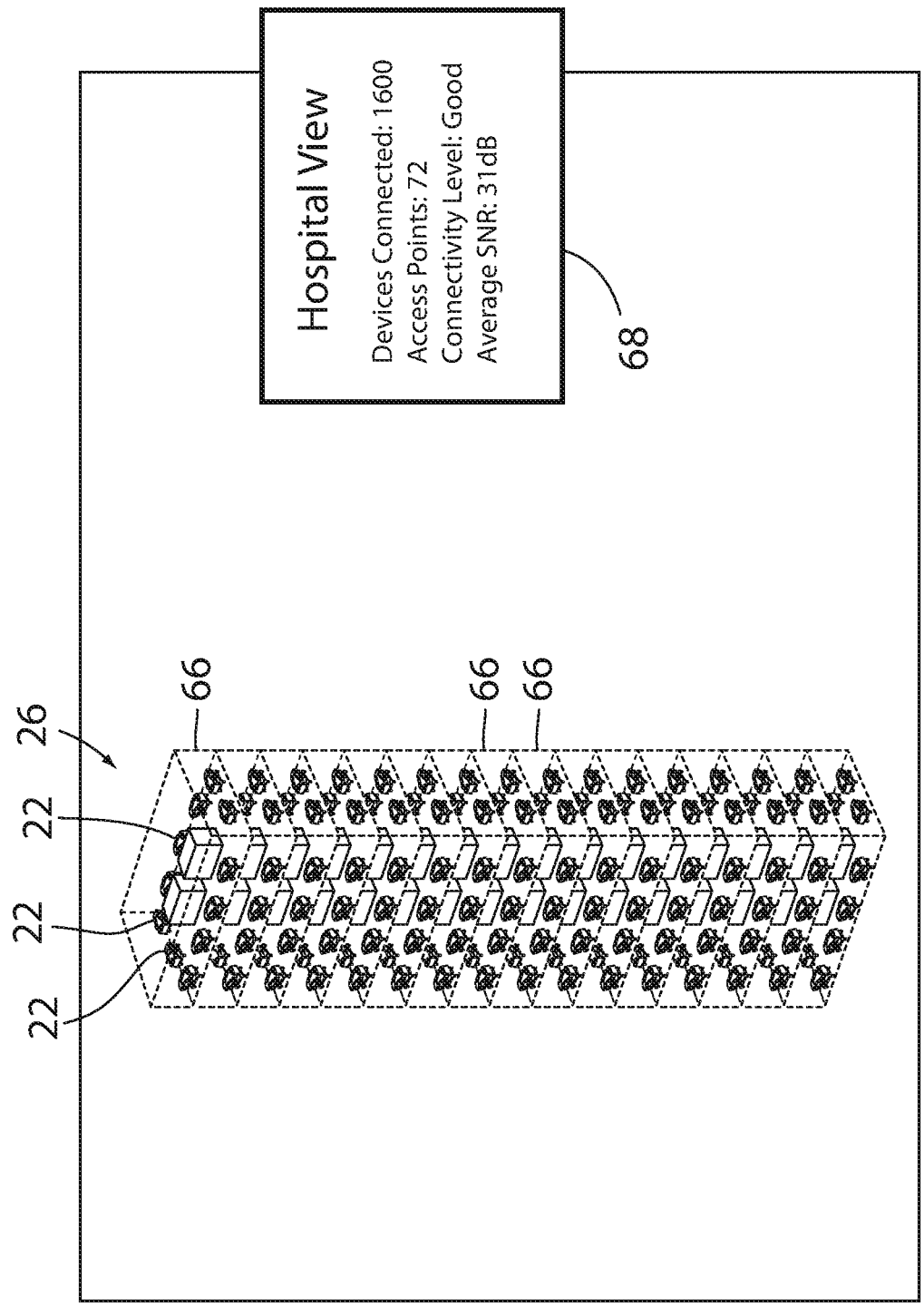
FIG. 3 is a perspective view of an arbitrary facility in which the monitoring system of FIG. 1 may be employed, including an example of an aggregated set of data that may be displayed on one or more user interfaces of the system.

Monitoring system 20 is also adapted, in at least some embodiments, to include floorplans for each of the various floors of facility 26 so that the location information of each person support apparatus 22 can be correlated to the floorplan for the particular floor of facility 26 on which the person support apparatus 22 is located. For example, FIG. 3 shows an illustrative facility 26 having a plurality of floors 66. Support apparatus server 64 includes data defining the floorplans for each of the floors 66. Further, support apparatus server 64 correlates the floorplan data with the location data of each of the person support apparatuses 22, thereby allowing user interfaces 32 (whether on board person support apparatuses 22 or not) to display the location of each person support apparatus 22 within the floorplan of facility 26, such as shown in FIG. 3.

Support apparatus server 64 is also adapted to gather the RF spectrum data from each of the RF spectrum analyzers 36 and present aggregated data regarding the collective connectivity of the persons support apparatuses 22. For example, support apparatus server 64 is adapted, in at least one embodiment, to generate a set of aggregated connectivity data 68, such as that shown in FIG. 3. Aggregated connectivity data set 68 includes an indication of the total number of devices that are currently connected to the wireless access point 28, the total number of access points 28, the average or median connectivity level of the wireless devices (including person support apparatuses 22) to the access point 28, and the average or median signal to noise ratio (SNR) of the wireless signals between those devices and the access points 28. Other aggregated data may alternatively, or additionally, be gathered by server 64 and made available for display on any of the user interfaces 32.

Figure 4:
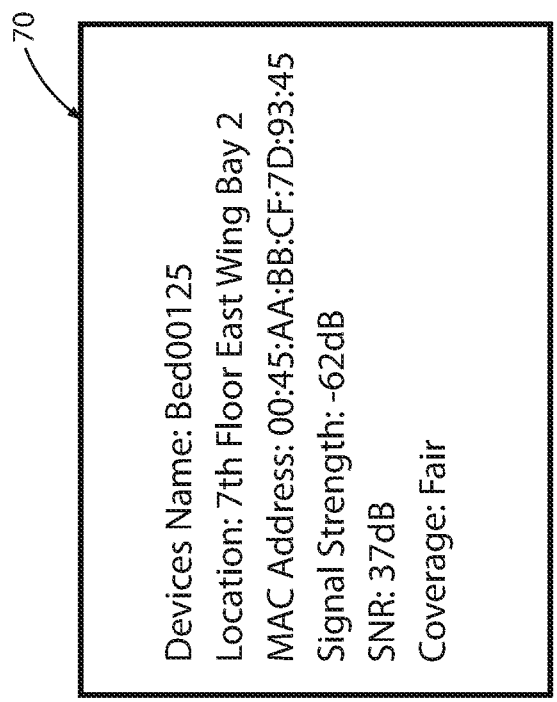
FIG. 4 is an illustration of an individualized set of data that may be displayed on one or more of the user interfaces of the monitoring system of FIG. 1.

In addition to aggregated data, monitoring system 20 is also adapted to provide individualized RF spectrum data regarding each of the person support apparatuses 22. For example, FIG. 4 illustrates an individual data set 70 that provides RF spectrum data for an individual person support apparatus 22. As shown therein, individual data set 70 identifies the name of the person support apparatus 22 (e.g. BED00125), the location of the person support apparatus 22 within the facility 26 (e.g. $7^{th}$ Floor East Wing Bay 2), the media access control (MAC) address of the person support apparatus 22, the signal strength of the signals from the access point 28 with which the person support apparatus 22 is in communication, the signal-to-noise ratio of those signals, and a qualitative description of the connectivity of person support apparatus 22 (e.g. poor, fair, good, excellent). Still other information may be gathered about individual person support apparatuses 22 and made available for displaying on one of user interfaces 32.

The RF spectrum data gathered by RF spectrum analyzers 36 is communicated to support apparatus server 64 via wireless communication module 34 and access points 28.

Thus, communication module 34 uses at least some of the same RF spectrum that RF spectrum analyzer 36 analyzes in order to communicate the results of that analysis to server 64. In at least one embodiment, wireless communication modules 34 are further adapted to communicate directly with other wireless communication modules 34 in a mesh network style of communicating such that—if one or more person support apparatuses 22 are out-of-range of a wireless access point 28, or otherwise unable to communicate with a wireless access point 28—they can forward their messages to another person support apparatus 22 which then relays the messages onto an access point 28, or to one or more other person support apparatuses 22 that are in communication with an access point 28. The inclusion of such a mesh networking ability is disclosed in commonly assigned U.S. patent application Ser. No. 13/802,855 filed Mar. 14, 2013 by inventors Michael Hayes et al. and entitled PATIENT SUPPORT APPARATUS COMMUNICATION SYSTEMS, and commonly assigned U.S. Pat. No. 8,461,982 issued Jun. 11, 2013 to inventors David Becker et al. and entitled COMMUNICATION SYSTEM FOR PATIENT HANDLING DEVICES, the disclosures of both of which are hereby incorporated herein in their entirety. Such mesh networking thereby allows RF spectrum data to be centrally gathered at support apparatus server 64 even in situations where one or more person support apparatuses 22 are unable to communicate directly with an access point 28.

In addition to RF spectrum analyzers 36, each person support apparatus 22 includes, in at least one embodiment of monitoring system 20, a packet sniffer 38 (FIG. 2). Packet sniffers 38 detect wireless packets traveling within the detection vicinity of wireless communication module 34. Packet sniffers 38 are adapted to analyze the detected packets and provide information about the detected packets to user interfaces 32 (both those on board person support apparatuses 22 and those off-board person support apparatuses 22). Such information includes the destination and source of the detected packets. For example, in one embodiment, packet sniffers 38 detect the media access control (MAC) addresses of the sender and receivers of packet and/or the internet protocol (IP) address of the sender and receiver of packets. Packet sniffers 38 may also detect the OUI (organizationally unique identifier) contained within packets and make that identifier available for display on user interfaces 32.

FIG. 5 illustrates in greater detail an example of packet traffic data 72 that is detected by packet sniffers 38. As can be seen therein, packet traffic data 72 includes a list of approximately twenty-one packets were detected by one of the packet sniffers 38 and that are arranged in chronological sequence. A sequence column 73 assigns a number to each packet based on their detection time. A time column 74 indicates the precise time that each of the packets was detected. A source column 76 indicates the source of each packet. The destination of each of the packets is also listed in a destination column 78 followed by a protocol column 80 that identifies the protocol of the packet. Although the protocol types shown in FIG. 6 only include the Transmission Control Protocol (TCP) and the hypertext transfer protocol (HTTP), multiple other protocols may be detected, including, but not limited to, an address resolution protocol (ARP), an encapsulating security payload (ESP) protocol, and any of a variety of proprietary protocols (e.g. the BJNP protocol used by printers manufactured by the Canon company of Tokyo, Japan). Still other types of protocols are also detectable by packet sniffer 38. The length of each of the detected packets is also indicated in a length column 82, which is followed by an information column 84 that provides information about the content of the packet.

Figure 6:
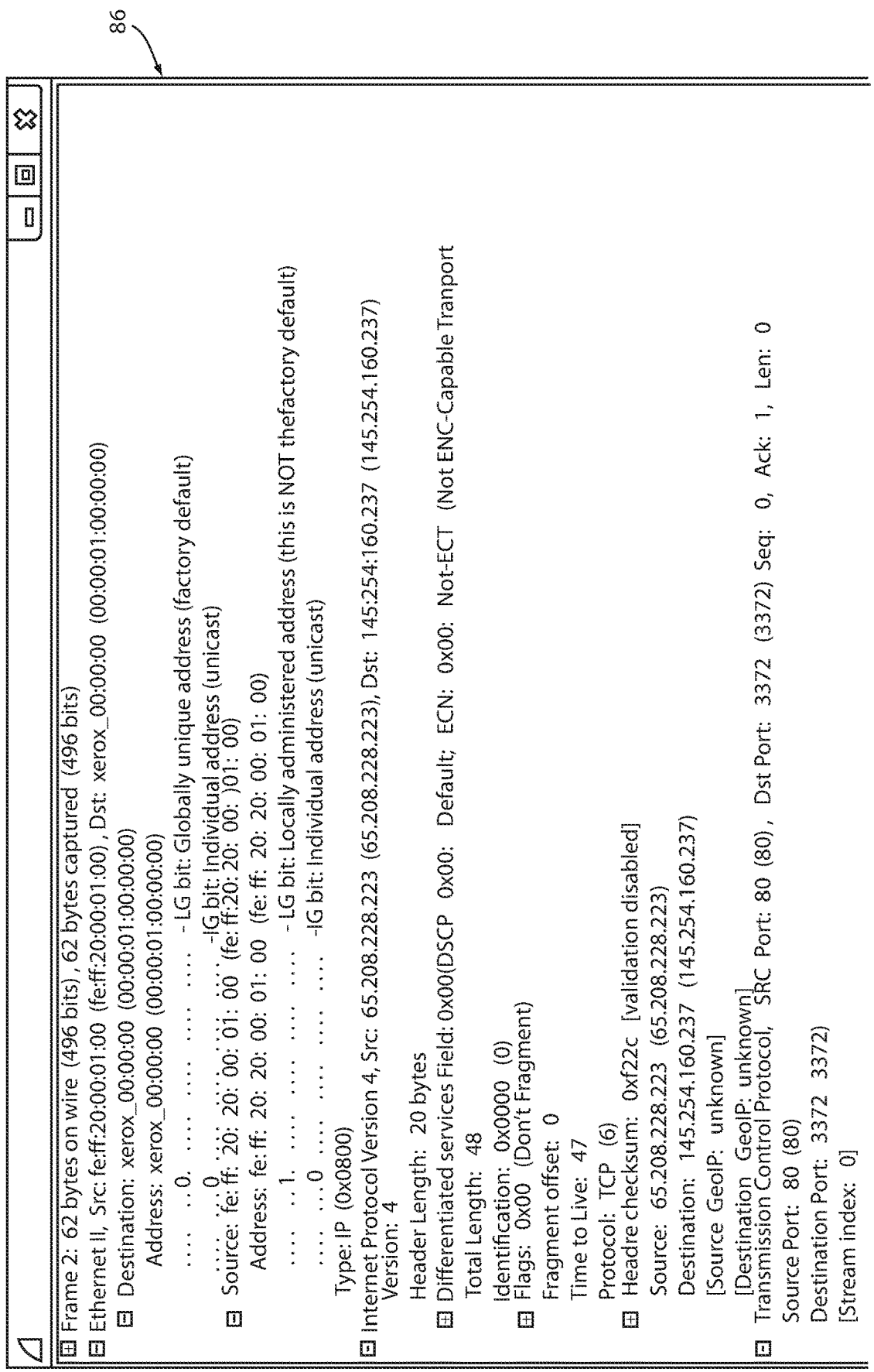
FIG. 6 is an illustration of detailed packet data regarding one of the packets captured in FIG. 5 that may be displayed on one or more of the user interfaces of the system of FIG. 1.

More detailed information about each and every one of the packets gathered by packet sniffer 38 is also available. For example, FIG. 6 illustrates a detailed packet window 86 that is displayed on one of user interfaces 32 when a user selects a particular one of the packets listed in the packet traffic data of FIG. 5. In the example of FIG. 6, detailed packet window 86 provides detailed packet information about the second one of the packets shown in FIG. 5 (corresponding to time 0.911310). The further details shown in packet window 86 for this packet include information indicating that the packet contains an Ethernet frame, including the source and destination of the Ethernet frame. Packet window 86 also displays details regarding the Internet Protocol used (e.g. version, header length, differentiated services field, flags, header checksum, etc.); and information regarding the Transmission Control Protocol (TCP), such as the source and destination ports, sequence number, acknowledgement number, header length, window size value, checksum, and a sequence/acknowledgement analysis. Still other details may be included depending on the type of packet, such as, but not limited to, an interface ID, an encapsulation type, the arrival time and date, an amount of time shifting, the epoch time, time deltas, frame numbers and lengths, and/or capture lengths. Still other types of packet information can be gathered by packet sniffer 38 and displayed in packet window 86.

When off-board communication controller 62 (FIG. 2) sends packet data gathered by packet sniffer 38 to support apparatus server 64 using wireless transceiver 60, off-board communication controller 62 is further adapted to either include information with the transmitted data that identifies the location of that particular person support apparatus 22 within facility 26, or to include an identifier with the transmitted data that uniquely identifies that person support apparatus 22 and that can be correlated to other information that identifies the location of that person support apparatus 22. In this manner, the location within facility 26 at which the packet data is gathered by each packet sniffer is known. Such location information can be gathered in any of the manners previously discussed. If off-board communication controller 62 is informed of the location of person support apparatus 22, then off-board communication controller 62 appends that location data to the gathered packet data. If off-board communication controller 62 is not informed of the location of person support apparatus 22, then support apparatus server 64 appends the location data to the packet data when support apparatus server 64 receives the packet data.

Packet sniffer 38, in addition to gathering details about packets detected by wireless communication module 34, is further adapted to store the gathered data indefinitely and/or transmit it to support apparatus server 64. The stored packets and their associated data (e.g. time and location) are stored, in at least one embodiment, until a user utilizes user interface 32 to delete them. User interface 32, whether on board person support apparatus 22 or coupled to server 64, is adapted to organize the gathered data such that technicians can view and sort the data. Thus, for example, if a technician wants to know how many packets were detected by a particular person support apparatus 22 over a specific time frame, he or she can use one of user interfaces 32 to query the information gathered by packet sniffers 38 and find such data. User interfaces 32 are also adapted to query the packet data by location, thereby enabling a user, for example, to be able to search for all packets detected by person support apparatuses 22 within a selected room over a selected time period (regardless of whether or not different person support apparatuses 22 were moved into and/or out of the room over the selected time period).

The packets detected by packet sniffer 38 include not only the wireless packets transmitted to or from the access point 28 that wireless transceiver 60 is currently in communication with, but also any other packets detected by wireless transceiver 60, regardless of the source or destination of those packets. That is, packet sniffer 38 identifies and stores those packets that are transmitted between the access point 28 and other devices that are in communication with that access point. Further, packet sniffer 38 also identifies and stores packets that are transmitted between other access points 28 and devices. Still further, packet sniffer 38 identifies and stores packets that are transmitted between access points of networks other than local area network 30 (e.g. access points of wireless networks from adjacent buildings or businesses other than the healthcare facility 26 in which person support apparatuses 22 are positioned).

Thus, for example, if a particular person support apparatus 22 is communicating via WiFi with a first access point 28 via WiFi channel 11 (2.462 GHz), packet sniffer 38 is adapted to detect, analyze, and store packets that are being transmitted over the other WiFi channels (e.g. WiFi channels 1-10 and possibly channels 12 and 13, which correspond to 2.412, 2.417, 2.422, 2.427, 2.432, 2.437, 2.442, 2.447, 2.452, 2.457, 2.467, and 2.472 Ghz, respectively). Still further, packet sniffer 38 is adapted to detect packets that are traveling to or from wireless access points of other networks besides local area network 30. Still further, packet sniffer 38 can be configured via user interface 32 to detect packets that are traveling directly between devices without utilizing an access point 28.

User interfaces 32 are configured to allow a user to specify what channels packet sniffers 38 monitor for packets, what access points 28 the packet sniffers 38 monitor packet traffic to or from, and/or what networks the packet sniffers 38 are to detect packets traveling over. Further, user interfaces are configured to allow a user to specify the aforementioned items for selected person support apparatuses 22, or for all of the person support apparatuses 22 within facility 26. In addition, user interfaces 32 are configured to allow a user to select and define thresholds that will trigger an alert if the selected thresholds are exceeded. For example, in at least one embodiment, user interface 32 is configured to allow a user to define thresholds for traffic volumes and/or packet latencies and to issue an alert if either or both of the traffic volume thresholds or packet latencies are exceeded. When so configured, user interface 32 communicates one or more messages to off-board communication controller 62 indicating the thresholds that are to be monitored. Off-board communication controller 62 thereafter monitors the packet data gathered by packet sniffer 38 and determines whether any of the user-defined thresholds are exceeded. If so, it issues an alert that, in at least one embodiment, involves transmitting an alert message to support apparatus server 64, which relays the message to appropriate personnel. Other types of alerts can, of course, be issued.

User interfaces 32 are also configured to allow a user to search through any of the gathered packet data, such as that illustrated in FIG. 5. Such searching is, in at least one embodiment, able to be carried out within specific data fields, such as the following: time, destination address, source address, protocol type, location, packet content, and still others. This enables a user to easily search for packet traffic that is specific to a particular device, time period, or other characteristic. User interfaces 32 are also configured in at least one embodiment to allow a user to search for and view aggregated information, such as periods when high or low packet traffic volumes are detected by a particular packet sniffer 38.

Figure 7:
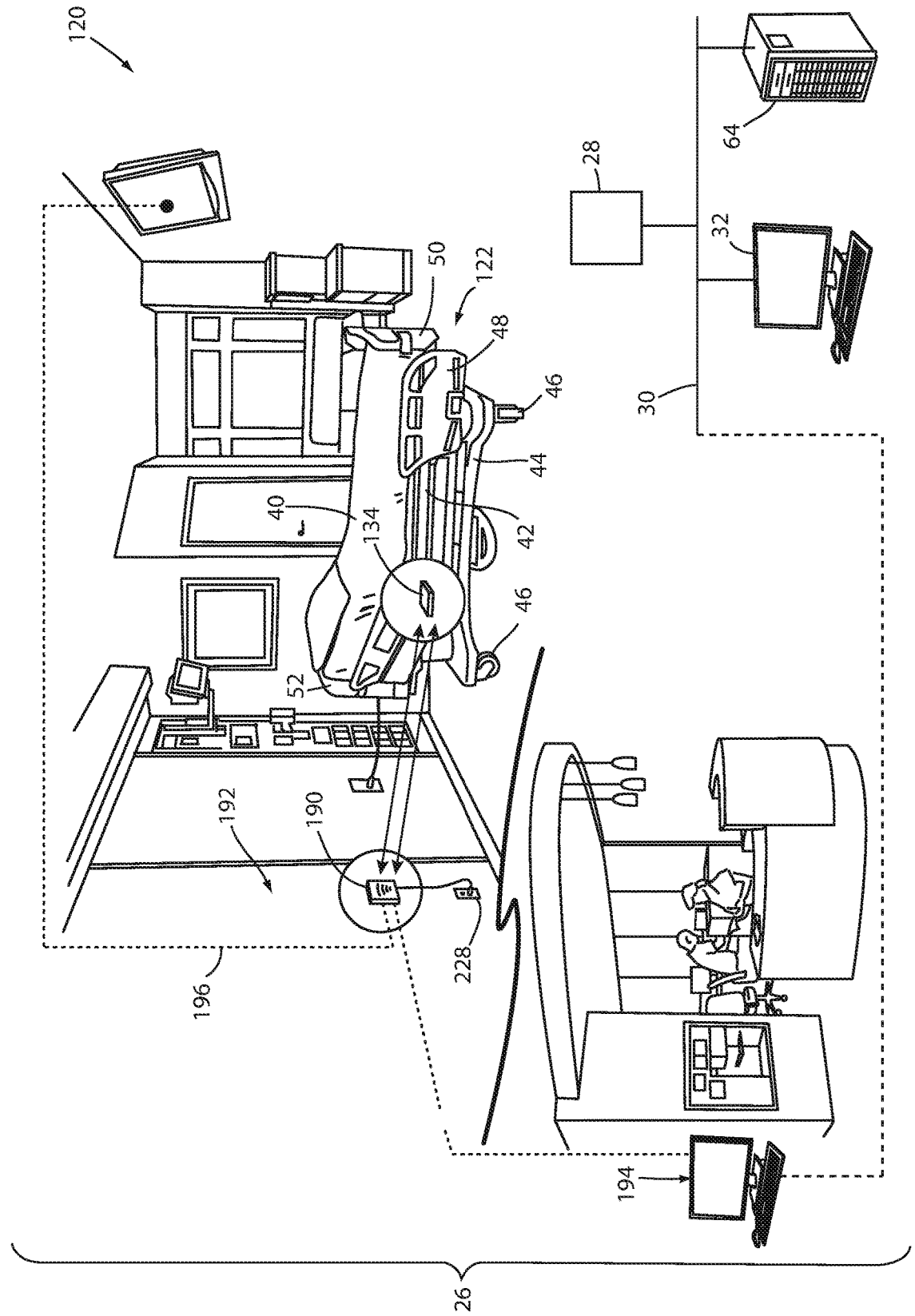
FIG. 7 is a perspective view of a monitoring system according to a second embodiment of the disclosure.

FIG. 7 illustrates an alternative monitoring system 120 according to another embodiment. Those components of monitoring system 120 that are the same as the components of monitoring system 20 are labeled with the same reference numbers and operate in the same manner previously described unless otherwise noted. Those components that are similar, but include additional or modified functionality, are labeled with the same reference number increased by one hundred. Those components that are not found in monitoring system 20 are labeled with a new reference number.

Monitoring system 120 includes a plurality of person support apparatuses 122 that are positioned in one or more rooms 24 of a facility 26. Monitoring system 120 further includes one or more wireless access point 28 that are coupled to a local area network 30. One or more user interfaces 32 are also included within system 20, some of which are coupled to person support apparatuses 122 and some of which are coupled to local area network 30. Local area network 30 includes a connection to support apparatus server 64, at least one user interface 32, and optionally (as indicated by the dotted line) a connection to a conventional nurse call system 194.

Monitoring system 120, like monitoring system 20, is adapted to monitor one or more aspects of the radio frequency (RF) environment of facility 26, such as those described above. That is, monitoring system 120 is specifically adapted to gather one or more of the following types of information about the RF environment of facility 26: the extent of wireless coverage of the wireless access points 28 within facility 26, measurements of rates at which data is communicated to and/or from wireless access points 28; the ability of wirelessly communicating devices to roam throughout facility 26 without losing communication with one or more access points 28; signal strengths of access points 28 and devices in communication therewith at different locations of facility 26; sources and strengths of RF interference; and/or quality of service of the wireless portions of local area network 30. In addition to, or in lieu of gathering such RF data, monitoring system 120 is adapted, in at least one embodiment, to detect wireless packets traveling over the wireless portions of local area network 30 (and/or other networks that are within range of the person support apparatuses 122) and to report statistics and traffic data regarding the detected packets, as will be discussed in greater detail below.

Monitoring system 120 differs from monitoring system 20 in that person support apparatuses 122 includes a wireless communication module 134 that perform one or more additional functions beyond those of wireless communication modules 34. One such additional function performed by wireless communication module 34 is communication with a fixed locator unit 190. Fixed locator units 190 are mounted, in at least one embodiment, to the walls of facility 26, such as wall 192 (FIG. 7). Fixed locator units 190 are adapted to communicate with a conventional nurse call system 194 and a conventional room control 196. Room control 196 controls one or more aspects of the room in which the person support apparatus 122 is located, such as, for example, a television.

Wireless communication module 134 and fixed locator unit 190 are adapted to establish a communication link between the two that allows person support apparatus 122 to communicate with the conventional nurse call system 194 and/or the conventional room control 196 without the need, such as in prior systems, to connect a cable between person support apparatus 122 and a headwall connector that is coupled to the nurse call system 194 and room control 196. This relieves a caregiver associated with person support apparatus 122 of the need to make this manual wired connection, thereby reducing the labor of the caregiver. This also relieves the caregiver of the need to manually disconnect the wired cable—that would otherwise be necessary—when moving the person support apparatus 122 to a new location. Still further, this reduces the physical clutter within the vicinity of person support apparatus 122. The wireless communication link between module 134 and fixed locator unit 190 utilize a different communication protocol than that used by module 134 when communicating with access points 28, as will be discussed in greater detail below.

Figure 8:
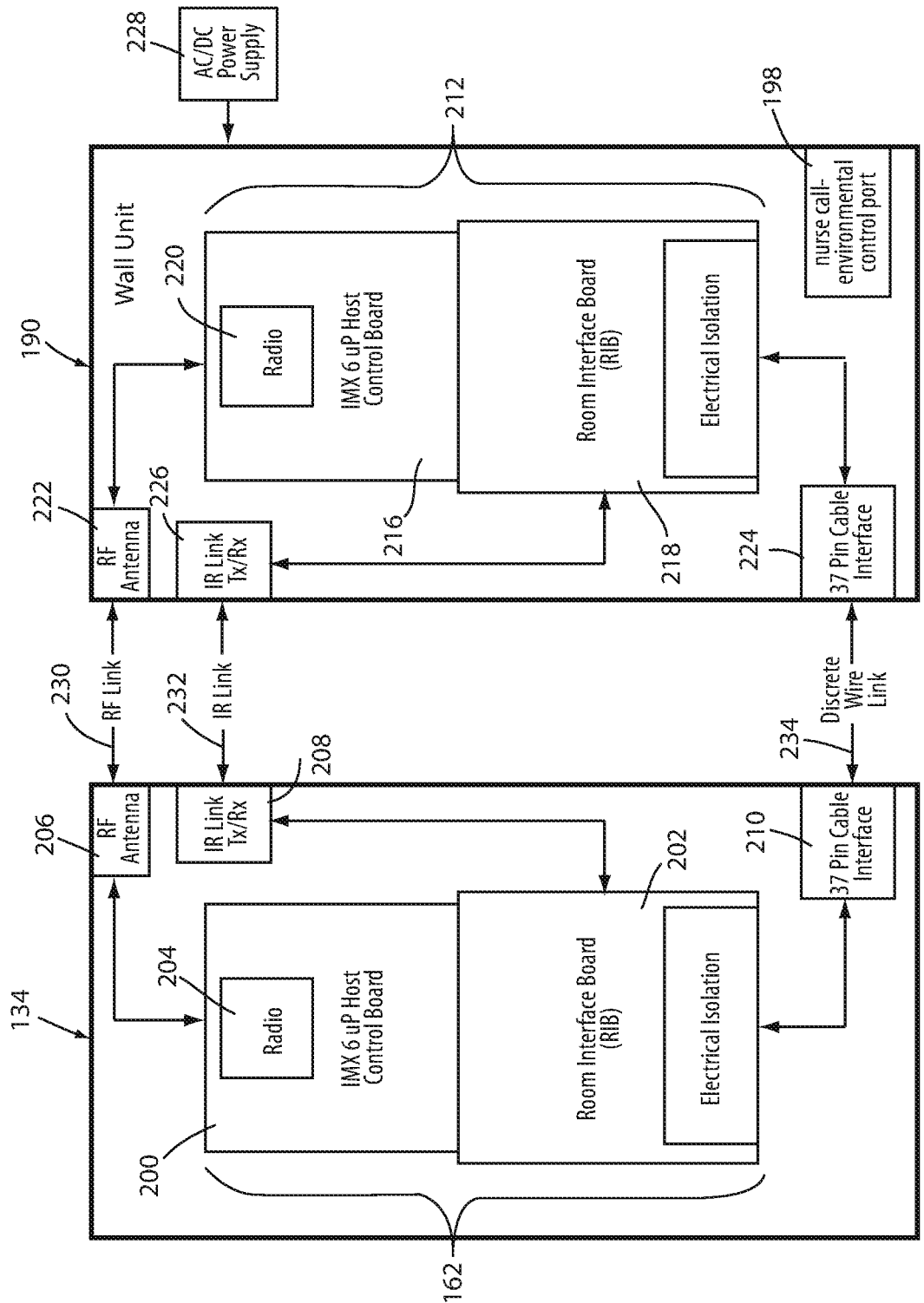
FIG. 8 is a block diagram of a wireless communication module and wall unit used in the system of FIG. 7.

FIG. 8 illustrates fixed locator unit 190 and wireless communication module 134 in more detail. Wireless communication module 134 includes an off-board communication controller 162 that is comprised of two separate boards: a host control board 200 and a room interface board 202. Each of the boards 200 and 202 include at least one conventional microcontroller. Host control board 200 further includes a radio 204 that is coupled to an RF antenna 206. Although not illustrated in FIG. 8, host control board 200 and its associated electronics carry out the functions of an RF analyzer and a packet sniffer in addition to the other functions discussed herein. These RF analyzer and packet sniffing functions are carried out in any of the previous manners described above with respect to RF spectrum analyzer 36 and packet sniffer 38. Further, although not shown in FIG. 8, wireless communication module 134 is communicatively coupled to a person support apparatus controller 54 that is, in turn, coupled to a user interface. The user interface is configured to carry out any of the aforementioned functions of user interfaces 32.

Wireless communication module 134 further includes an infrared transceiver 208 that is in communication with, and under the control of, room interface board 202. As will be discussed in greater detail below, infrared transceiver 208 is adapted to communicate with an infrared transceiver coupled to locator unit 190 in order to allow communication module 134 to determine its location. Room interface board 202 is also in communication with a thirty-seven pin cable interface 210. Thirty-seven pin cable interface 210 is adapted to receive a standard thirty-seven pin nurse call cable that can be coupled to a port of a conventional nurse call system in the event that wireless communication with the nurse call system via radio 204 is not feasible or desired.

Fixed locator unit 190 includes a fixed locator controller 212 that comprises a host control board 214 and a room interface board 216. Host control board 214 includes a radio 220 that is coupled to an antenna 222. Room interface board 218 is coupled to both a thirty-seven pin interface 224 and an IR transceiver 226. Fixed locator unit 190 receives its electrical power from a power supply 228 which, in at least one embodiment, is a conventional AC wall outlet. Radio 220 of fixed locator unit 190 is adapted to wirelessly communicate with radio 204 of wireless communication module 134 over an RF link 230. IR transceivers 208 and 226 of wireless communication module 134 and fixed locator unit 190 are adapted to wirelessly communicate with each other using infrared electromagnetic waves over an IR link 232. Still further, thirty-seven pin cable interfaces 210 and 224 are adapted to communicate with each other over a wired link 234 when a cable, or other wire, is physically present and coupled to interfaces 210 and 224.

Fixed locator unit 190 also includes a nurse call and room control port 198 that is internally coupled to room interface board 218 and adapted to couple externally to conventional nurse call system 194 and room control 196. In some embodiments, port 198 includes a thirty-seven pin connector that is adapted to be inserted into 37 mating sockets of a conventional headwall connector. Such thirty-seven pin connections are one of the most common types of connectors found on existing headwalls of medical facilities for making connections to the nurse call system 194 and/or the room controls 196. Fixed locator unit 190 of FIG. 8 is therefore configured to mate with one of the most common type of headwall connectors used in medical facilities. Such 37 pin connectors, however, are not the only type of connectors, and it will be understood that port 198 can be adapted to electrically couple to different types of headwall connectors.

Fixed locator unit 190 is adapted to wirelessly receive signals from person support apparatus 122 and deliver the signals to the nurse call system 194 and room controls 196 in a manner that matches the way the signals would otherwise be delivered were a conventional cable connected between person support apparatus 122 and each of nurse call system 194 and room controls 196. In at least one embodiment, in addition to sending signals received from wireless communication module 134 of person support apparatus 122 to the nurse call system 194 and/or room controls 196, fixed locator unit 190 is also adapted to forward signals received from the nurse call system 194 and/or room controls 196 to wireless communication module 134 of person support apparatus 122. Fixed locator unit 190 is therefore adapted, in at least one embodiment, to provide bidirectional communication between person support apparatus 122 and either or both of nurse call system 194 and room controls 196. Such bidirectional communication includes, but is not limited to, communicating audio signals between a person supported on person support apparatus 122 and a caregiver positioned remotely from person support apparatus 122 (which is accomplished by fixed locator unit 190 forwarding the audio signals of the person on person support apparatus 122 to nurse call system 194, and vice versa).

Fixed locator unit 190 communicates the data and signals it receives from wireless communication module 134 to nurse call system 194 and/or room controls 196 in any of the manners described in more detail in commonly assigned U.S. patent application Ser. No. 14/819,844 filed Aug. 6, 2015 by inventors Krishna Bhimavarapu et al. and entitled PERSON SUPPORT APPARATUSES WITH WIRELESS HEADWALL COMMUNICATION, the complete disclosure of which is incorporated herein by reference. Indeed, in some embodiments, fixed locator unit 190 includes any or all of the same functionality described with respect to headwall interface 38 of the aforementioned Ser. No. 14/819,844 patent application. In one such an embodiment, fixed locator controller 212 is configured to include the processors 96 and 112 described in the Ser. No. 14/819,844 patent application.

Wireless communication module 134 communicates wirelessly with fixed locator unit 190 via radio 204. In the embodiment illustrated in FIG. 8, radio 204 is adapted to communicate using both a WiFi protocol (IEEE 802.11) and a modified Bluetooth protocol (IEEE 802.15.1). Similarly, radio 220 of fixed locator unit 190 is adapted to communicate using the same modified Bluetooth protocol, and in some embodiments is also adapted to communicate using the WiFi protocol. Wireless communication module 134 uses the WiFi communication protocol to communicate with wireless access points 28 of facility 26 (see, e.g. FIG. 7). Fixed locator unit 190, if it is configured to include WiFi communications abilities, also uses the WiFi protocol to communicate with wireless access points 28. Wireless communication module 134 and fixed locator unit 190 utilize the modified Bluetooth protocol to communicate with each other, as will be described in greater detail below.

The unmodified Bluetooth protocol utilizes a frequency hopping spread spectrum (FHSS) technique for communicating that involves communicating over 79 designated Bluetooth communication channels. This contrasts with WiFi, which uses a direct sequence spread spectrum (DSSS) technique for communicating. Each Bluetooth channel has a bandwidth of approximately one megahertz. (Bluetooth version 4 uses 2 MHz spacing and accommodates only 40 channels). The first channel starts at 2402 MHz and the remaining channels continue sequentially up to 2480 MHz. The frequency hopping aspects of unmodified Bluetooth involve changing frequencies among these 79 channels multiple times per second, such as roughly 1600 hops per second. Starting with Bluetooth version 2.1, Bluetooth communication has used an adaptive frequency hopping spread spectrum technique. This adaptive frequency hopping involves taking a snapshot of the signals strengths on each of the designated Bluetooth channels and avoiding those channels that have signal strengths above a threshold.

The modified Bluetooth protocol utilized by wireless communication module 134 and fixed locator unit 190 takes multiple snapshots of the signals strengths of the Bluetooth channels over longer periods of time, stores them, and analyzes them to determine any patterns that may exist in the readings for each of the channels. These patterns are then used to determine whether or not an individual channel should continue to be used as one of the channels utilized in the frequency hopping technique. This provides better immunity against interference from WiFi and/or other signals that communicate using frequencies that overlap with the Bluetooth frequency range.

The modified Bluetooth communication protocol is carried out by host control board 200. Host control board 200, as noted previously, includes an RF spectrum analyzer that operates in the same manner as RF spectrums analyzer 36 described above. In addition, the RF spectrum analyzer of host control board 200 takes multiple snapshots of the signals it detects in each of the seventy-nine (or 40) Bluetooth communication channels. If the signal strengths detected from the multiple snapshots exceed a threshold level for more than a threshold number of the snapshots, then host control board 200 removes that particular channel from the channels available for communicating using the frequency hopping technique. If the signals strengths of the snapshots detected from the multiple snapshots do not exceed the threshold level for more than a threshold number of the snapshots, then host control board 200 continues to use those channels when communicating using the frequency hopping technique.

For example, suppose that host control board 200 takes ten signal strength readings and detects a signal on Bluetooth channel one (2402 MHz) that exceeds −50 dBm for each of the ten signal strength readings. In that case, host control board 200 will temporarily remove channel one from the set of Bluetooth channels that are available for communicating using frequency hopping because it is unlikely that a Bluetooth signal transmitted on that channel will be successfully received. The removal of channel one from the set of available Bluetooth channels will continue until enough subsequent snapshots are taken that are indicative of less usage of channel one. That is, host control board 200 repetitively takes snapshots of the signals strengths for each of the Bluetooth channels (e.g. once every one to ten seconds or so) and re-analyzes them. If the re-analysis indicates that a channel will likely have sufficient bandwidth, then host control board 200 will return the channel to the set of channels available for frequency hopping.

As another example, if contrast, if host control board 200 takes a sequence of signal strength readings and detects a signal on Bluetooth channel one that varies between −90 dBm and −80 dBm and has an average strength of, say, −85 dBm, host control board 200, in at least one embodiment, will determine that communication using channel one will likely not lead to destructive interference, and will therefore include channel on in the set of channels available for frequency hopping.

Host control board 200 does not look at only the last X number of signal strength readings when determining whether to include a Bluetooth channel within the set of those available for frequency hopping. Host control board 200 also looks at, in at least one embodiment, any patterns or trends that it can detect in previous readings, including previous readings that may have been taken minutes, hours, or days ago. For example, host control board 200 analyzes the signal strength readings to determine if there are certain times of the day that congestion is to be expected, or not to be expected, on various of the Bluetooth channels. Further, host control board 200 is programmed to detect patterns of channel usage of nearby devices that may be periodic, but not tied to any particular time of day. For example, a nearby device may repeatedly send bursts of packets utilizing Bluetooth or WiFi (which overlaps the Bluetooth frequency range) with a general regularity with relatively little packets between those bursts. To the extent those bursts of packets effectively consume all or most of the available throughput of a given Bluetooth channel during those bursts, host control board 200 removes the affected channels from the set of channels available for use in frequency hopping during those bursts and returns them to the set between the bursts.

The modified Bluetooth communication protocol utilized by wireless communication module 134 and fixed locator unit 190 therefore differs from the unmodified Bluetooth protocol in several manners. First, the modified protocol gathers signal strength readings more frequently than unmodified Bluetooth. Second, the modified protocol stores all of the signal strength readings and uses them when determining what channels to use, rather than using only the last signal strength reading. And third, the modified protocol involves analyzing the multiple gathered signal strength readings to detect patterns or trends and utilizing those patterns or trends to determine what channels to use for transmission. The modified Bluetooth communication protocol therefore provides Bluetooth communication abilities that are more immune to interference than the unmodified Bluetooth communication protocol.

Fixed locator units 190 and wireless communication modules 134 also include the ability to communicate with each other using IR link 232. IR link 232 is used for either of two purposes: to enable wireless communication module 134 (and thus its associated person support apparatus 122) to determine its location within facility 26, and to enable fixed locator units 190 and wireless communication modules 134 to continue to communicate with each other in the event RF link 230 becomes inoperable. The first of these two purposes—using IR link 232 for establishing the location of person support apparatus 122—is described first below, followed by a description of the second of these two purposes.

Fixed locator units 190 are positioned at fixed locations around a healthcare facility, such as adjacent each individual bay or area that a bed, or other person support apparatus, is customarily positioned. For example, in a typical hospital room that is designed to accommodate two patients, a first fixed locator unit 190 would be positioned adjacent the area in the room where the first bed was normally located, and a second fixed locator unit 190 would be positioned adjacent the area in the room where the second bed was normally located. The location of each fixed locator unit 190 is then surveyed and stored in an electronic memory that is accessible to support apparatus server 64 and/or other computer devices in communication with network 30.

Each fixed locator unit 190 includes a unique ID that uniquely identifies each individual fixed locator unit 190 within a given healthcare facility from each and every other fixed locator unit 190 within that healthcare facility. Controller 212 is programmed to respond to any interrogation from a wireless communication module 134 by transmitting that unique ID to the interrogating wireless communication module 134. Both this interrogation and response are communicated using IR link 232. IR link 232 has a relatively small communication range (e.g. one to three meters, as an example) such that, in the event a person support apparatus 122 is able to communicate with a fixed locator unit 190 via IR link 232, the person support apparatus 122 must be positioned relatively closely to that fixed locator unit 190. Consequently, when a person support apparatus 122 communicates with a fixed locator unit 190 via IR link 232, communication module 134 determines that its current location is the same as that of the fixed locator unit 190 it is currently communicating with. The communication between fixed locator unit 190 and wireless communication module 134 via IR link 232 includes transmitting the unique identifier of the fixed locator unit to wireless communication module 134. Wireless communication module 134 then either consults the surveyed data that indicates the location of the fixed locator unit having that unique identifier, or transmits the unique identifier to support apparatus server 64, which then correlates the unique identifier with a location of person support apparatus 122. This transmission to server 64 is done via radio 204, which communicates with an access point 28.

As was also noted, IR link 232 is also used as a backup communication link in the event RF link 230 becomes inoperable. In such a situation, data that was normally communicated between fixed locator unit 190 and wireless communication module 134 via RF link 230 is transmitted via IR link 232. In one such embodiment, wireless communication module 134 transmits an alert message to support apparatus server 64 (via radio 204 and access points 28) indicating that its RF link 230 with its associated fixed locator unit 190 has become inoperable and that it is now using IR link 232. Server 64 forwards this information to one or more user interfaces 32 or mobile devices to alert appropriate personnel that corrective actions should be taken to restore RF link 230.

In at least one embodiment, RF link 230 is used to communicate status information regarding person support apparatus 122, voice signals between an occupant of person support apparatus 122 and a remote caregiver, and environmental room control signals. In the event RF link 230 becomes inoperable, wireless communication module 134 utilizes IR link 232 to transmit only high priority signals. In one such embodiment, only the audio signals are considered high priority. In at least one other embodiment, only the audio signals and an exit detection alert signal are considered high priority. In still other embodiments, still other signals are considered high priority. In such situations, those signals that are not considered high priority are not transmitted between wireless communication module 134 and fixed locator unit 190.

In another alternative embodiment, RF spectrum analyzer 36 and/or packet sniffer 38 are incorporated into devices other than person support apparatuses 22. For example, in one such embodiment, one or more of the fixed locator wall units 190 include an RF spectrum analyzer 36 and/or a packet sniffer 38. When so incorporated into a fixed locator wall unit 190, the RF spectrum analyzer 36 detects the magnitude of signals over one or more RF frequency ranges and the packet sniffer 38 detects any packets within the vicinity of pack sniffer 38, regardless of the destination and/or source of the packets. The RF spectrum data and/or packet data is then reported to person support apparatus 22 (such as via one of links 230, 232, and/or 234; FIG. 8) and/or to person support apparatus server 64 (such as via radio 220 communicating directly with one or more access points 28). The reported data also includes data indicating the location of the fixed locator unit 190 so that the receiving entity is able to correlate the data with a location within facility 26.

It will be understood that the use of the term "transceiver" herein is intended to cover not only devices that include a transmitter and receiver contained within a single unit, but also devices having a transmitter separate from a receiver, and/or any other devices that are capable of both transmitting and receiving signals or messages. It will also be understood that, although wireless communication module 134 has been described herein as including an RF spectrum analyzer and/or a packet sniffer, such an RF spectrum analyzer and/or packet sniffer may alternatively be incorporated into fixed locator unit 190. When so incorporated, the gathered RF spectrum data and/or packet data is either transmitted to support apparatus server 64 via a WiFi link between units 190 and one or more access points 28, or it is transmitted to an adjacent person support apparatus 122, which may, in turn, forward the data to server 64.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:
1. A system comprising:
 a plurality of person support apparatuses, each of the person support apparatuses including a packet sniffer configured to detect packets transmitted over a first communication channel between an access point and a first device other than the person support apparatus; and a user interface configured to communicate with the plurality of person support apparatuses to receive data regarding the detected packets from the packet sniffer, to display data regarding the detected packets, and to allow a user to define a threshold for traffic detected by the packet sniffers wherein the packet sniffers are configured to issue an alert if the traffic exceeds the threshold.

2. The system of claim 1 wherein the user interface is coupled to at least one of the plurality of person support apparatuses, and the plurality of person support apparatuses includes at least one bed and at least one chair.

3. The system of claim 1 wherein the user interface is spaced from the plurality of person support apparatuses and in communication with a server that is coupled to a local area network, the local area network including the access point.

4. The system of claim 1 wherein the packet sniffer is further configured to detect packets transmitted over a second communication channel between the access point and a second device.

5. The system of claim 1 wherein the packet sniffer is configured to detect traffic volumes of the first device and forward the traffic volumes to the user interface.

6. A person support apparatus comprising:
a support surface configured to support a person; an actuator configured to move a component of the person support apparatus;
a wireless transceiver configured to wirelessly communicate with a first access point of a local area network over a first communication channel selected by the first access point;
a packet sniffer in communication with the wireless transceiver, the packet sniffer configured to detect packets transmitted over a second communication channel between a second access point and a device other than the person support apparatus;
a user interface comprising a touch screen display, the touch screen display configured to display both data regarding the packets detected by the packet sniffer and data used to control the person support apparatus, the touch screen display further configured to display a touch icon; and
a controller in communication with the actuator and the user interface, the controller configured to drive the actuator in response to a user pressing on the touch icon.

7. The person support apparatus of claim 6 wherein the packet sniffer is further configured to detect packets transmitted over the second communication channel while the person support apparatus is communicating with the first access point over the first communication channel.

8. The person support apparatus of claim 6 wherein the packet sniffer is configured to identify a source identifier and a destination identifier of each packet.

9. The person support apparatus of claim 8 wherein the source identifier is at least one of an Internet Protocol (IP) source address and Media Access Control (MAC) source address, and the destination identifier is at least one of an IP destination address and a MAC destination address.

10. The person support apparatus of claim 8 wherein the packet sniffer records in memory contents of the packets, including those packets that do not have a source identifier or destination identifier corresponding to the person support apparatus.

11. The person support apparatus of claim 10 wherein the packet sniffer maintains the contents of the packets in the memory until directed by an authorized user to discard.

12. The person support apparatus of claim 6 further comprising a scale system configured to detect a weight of the person, wherein the touch screen display is further adapted to display the weight of the person.

* * * * *